US008949801B2

(12) United States Patent
Andrade et al.

(10) Patent No.: US 8,949,801 B2
(45) Date of Patent: Feb. 3, 2015

(54) FAILURE RECOVERY FOR STREAM PROCESSING APPLICATIONS

(75) Inventors: Henrique Andrade, Croton-on-Hudson, NY (US); Bugra Gedik, White Plains, NY (US); Gabriela Jacques da Silva, Champaign, IL (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 12/465,215

(22) Filed: May 13, 2009

(65) Prior Publication Data

US 2010/0293532 A1 Nov. 18, 2010

(51) Int. Cl.
G06F 9/45 (2006.01)
G06F 11/14 (2006.01)
G06F 11/07 (2006.01)
G06F 11/00 (2006.01)

(52) U.S. Cl.
CPC ............ *G06F 11/1438* (2013.01); *G06F 11/07* (2013.01); *G06F 11/00* (2013.01); *G06F 11/1471* (2013.01)
USPC .................... 717/140; 714/15; 714/16; 714/1

(58) Field of Classification Search
CPC .................................................. G06F 11/1438
USPC ...................... 717/140; 714/15, 16
See application file for complete search history.

(56) References Cited

U.S. PATENT DOCUMENTS

| 5,561,762 | A | 10/1996 | Smith et al. |
| 6,154,877 | A * | 11/2000 | Ramkumar et al. .......... 717/114 |
| 6,401,216 | B1 * | 6/2002 | Meth et al. ...................... 714/16 |
| 6,671,821 | B1 * | 12/2003 | Castro et al. .................... 714/4.3 |
| 6,999,432 | B2 | 2/2006 | Zhang et al. |
| 7,331,000 | B2 * | 2/2008 | Ohno et al. ..................... 714/20 |
| 7,409,676 | B2 | 8/2008 | Agarwal et al. |
| 7,430,610 | B2 | 9/2008 | Pace et al. |
| 7,467,333 | B2 | 12/2008 | Keeton et al. |
| 7,500,170 | B2 | 3/2009 | Wiatrowski et al. |

(Continued)

OTHER PUBLICATIONS

"Qian Zhu Liang Chen Gagan Agrawal";"Supporting Fault-Tolerance in Streaming Grid Applications";:Apr. 14-18, 2008;"Dept. of Comput. Sci. & Eng., Ohio State Univ., Columbus, OH";"12 Pages".*

(Continued)

*Primary Examiner* — Wei Zhen
*Assistant Examiner* — Brahim Bourzik
(74) *Attorney, Agent, or Firm* — William Stock

(57) ABSTRACT

In one embodiment, the invention is a method and apparatus for failure recovery for stream processing applications. One embodiment of a method for providing a failure recovery mechanism for a stream processing application includes receiving source code for the stream processing application, wherein the source code defines a fault tolerance policy for each of the components of the stream processing application, and wherein respective fault tolerance policies defined for at least two of the plurality of components are different, generating a sequence of instructions for converting the state(s) of the component(s) into a checkpoint file comprising a sequence of storable bits on a periodic basis, according to a frequency defined in the fault tolerance policy, initiating execution of the stream processing application, and storing the checkpoint file, during execution of the stream processing application, at a location that is accessible after failure recovery.

25 Claims, 8 Drawing Sheets

(56) References Cited

U.S. PATENT DOCUMENTS

| | | | |
|---|---|---|---|
| 7,536,595 | B1 | 5/2009 | Hiltunen et al. |
| 7,945,820 | B2 | 5/2011 | Kaefer et al. |
| 7,983,929 | B2 | 7/2011 | Zimmerman |
| 8,458,650 | B2 | 6/2013 | Andrade et al. |
| 8,631,094 | B1* | 1/2014 | Alpert et al. ............... 709/219 |
| 2005/0034014 | A1* | 2/2005 | Moser et al. ............... 714/17 |
| 2006/0004860 | A1* | 1/2006 | Liedes et al. ............. 707/104.1 |
| 2006/0123387 | A1 | 6/2006 | Shim et al. |
| 2009/0213854 | A1 | 8/2009 | Menendez |
| 2009/0299713 | A1 | 12/2009 | Miller et al. |
| 2010/0287535 | A1 | 11/2010 | Kim et al. |
| 2011/0239048 | A1 | 9/2011 | Andrade et al. |

OTHER PUBLICATIONS

Greg Bronevetsky, Daniel Marques, Keshav Pingali, Paul Stodghill ;"Automated Application-level Checkpointing of MPI Programs";"Oct. 10, 2003";"ACM New York","vol. 38";"11 Pages".*

Mattan Erez et al. "Fault Tolerance Techniques for the Merrimac Streaming Supercomputer" Conference on High Performance Networking and Computing, Proceedings of the 2005 ACM/IEEE conference on Supercomuputing, 2005. Consists of 11 pages.

Youngsu Chae, et al. "Silo, Rainbow, and Caching Token: Schemes for Scalable, Fault Tolerant Stream Caching," IEEE Journal on Selected Areas in Communications, vol. 20, No. 7, Sep. 2002, pp. 1328-1344.

Gerard J. M. Smit et al."Multi-core Architecture and Streaming Applications," SLIP '08, Apr. 5-6, 2008, Newcastle, United Kingdom, Copyright 2008 ACM, pp. 35-42.

Nesime Tatbul, "Staying Fit: Efficient Load Shedding Techniques for Distributed Stream Processing," *VLDB '07,* Sep. 23-28, 2007, Vienna, Austria, Copyright 2007 VLDB Endowment, pp. 159-170.

Jean Arlat,et al., "Fault Injection for Dependability Validation: A Methodology and Some Applications," IEEE Transactions on Software Engineering, vol. 16, No. 2, Feb. 1999, pp. 166-182.

Diamantino Costa, et al., "Joint Evaluation of Performance and Robustness of a COTS DBMS through Fault-Injection," Proceedings of the 2000 International Conference on Dependable Systems and Networks, 2000, consists of 10 unnumbered pages.

Mei-Chen Hsueh, et al., "Fault Injection Techniques and Tools," *Computer,* vol. 30, No. 4, pp. 75-82, Apr. 1997.

Chillarege R., et al., "Understanding Large System Failures—A Fault Injection Experiment," *IEEE Nineteenth International Symposium on Fault Tolerant Computing, FTCS-19. Digest of Papers,* Jun. 1989, pp. 356-363.

Hamilton D. L., et al., "Fault Tolerance Versus Performance Metrics for Robot System," *Proc. IEEE Conf. on Robotics and Automation,* 1996, pp. 1-16.

Parker D., et al., "A Method and Tool Support for Model-Based Semi-Automated Failure Modes and Effects Analysis of Engineering Designs," *SCS '04 Proceedings of the 9th Australian Workshop on Safety Critical Systems and Software,* 2004, pp. 89-95, vol. 47, ACM.

Basal N., et al., "Towards Optimal Resource Application in Partial-Fault Tolerant Application," *IEEE INFOCOM 2008.*

* cited by examiner

FAILURE RECOVERY FOR STREAM PROCESSING APPLICATIONS

REFERENCE TO GOVERNMENT FUNDING

This invention was made with Government support under Contract No. H98230-07-C-0383, awarded by the United States Department of Defense. The Government has certain rights in this invention.

BACKGROUND OF THE INVENTION

The present invention relates generally to component-based applications, and relates more specifically to fault tolerance techniques for stream processing applications, which are component-based applications.

Stream processing applications have emerged as a paradigm for analyzing streaming data (e.g., audio, video, sensor readings, and business data) in real time. Stream processing applications are typically built as data-flow graphs comprising interconnected stream operators that implement analytics over the incoming data streams. Each of these operators is a component.

During operation of a stream processing application, a stream operator may fail (i.e., stop executing its operations or responding to other operators) for any one or more of several reasons, including, but not limited to: a heisenbug (i.e., a computer bug that disappears or alters its characteristics when an attempt is made to study it) in the stream operator code (e.g., a timing error), a node failure (e.g., a power outage), a kernel failure (e.g., a device driver crashes and forces a machine reboot), a transient hardware failure (e.g., a memory error corrupts an application variable and causes the stream processing application to crash), or a network failure (e.g., the network cable gets disconnected, and no other node can send data to the operator).

Fault tolerance techniques of varying strictness are used to ensure that stream processing applications generate semantically correct results even in the presence of failure. For instance, sensor-based patient monitoring applications require rigorous fault tolerance, since data loss or computation errors may lead to catastrophic results. By contrast, an application that discovers caller/callee pairs by data mining a set of Voice over Internet Protocol (VoIP) streams may still be able to infer the caller/callee pairs despite packet loss or user disconnections (although with less confidence). The second type of application is referred to as "partial fault tolerant." Moreover, in some stream processing applications, it is better to produce partial results sooner rather than to produce complete results later.

SUMMARY OF THE INVENTION

In one embodiment, the invention is a method and apparatus for failure recovery for stream processing applications. One embodiment of a method for providing a failure recovery mechanism for a stream processing application includes receiving source code for the stream processing application, wherein the source code defines a fault tolerance policy for each of the components of the stream processing application, and wherein respective fault tolerance policies defined for at least two of the plurality of components are different, generating a sequence of instructions for converting the state(s) of the component(s) into a checkpoint file comprising a sequence of storable bits on a periodic basis, according to a frequency defined in the fault tolerance policy, initiating execution of the stream processing application, and storing the checkpoint file, during execution of the stream processing application, at a location that is accessible after failure recovery.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the invention is a method and apparatus for checkpointing of partial fault-tolerant component-based applications, such as stream processing applications. Checkpointing is a technique in which a snapshot of the current application state is stored and, in the case of failure, used to restart the execution of the application. Rather than enforce a single checkpointing policy for the entire stream processing application, embodiments of the invention allow an application developer to annotate application source code according to the portions of the application that the developer wishes to make fault tolerant.

Figure 1:
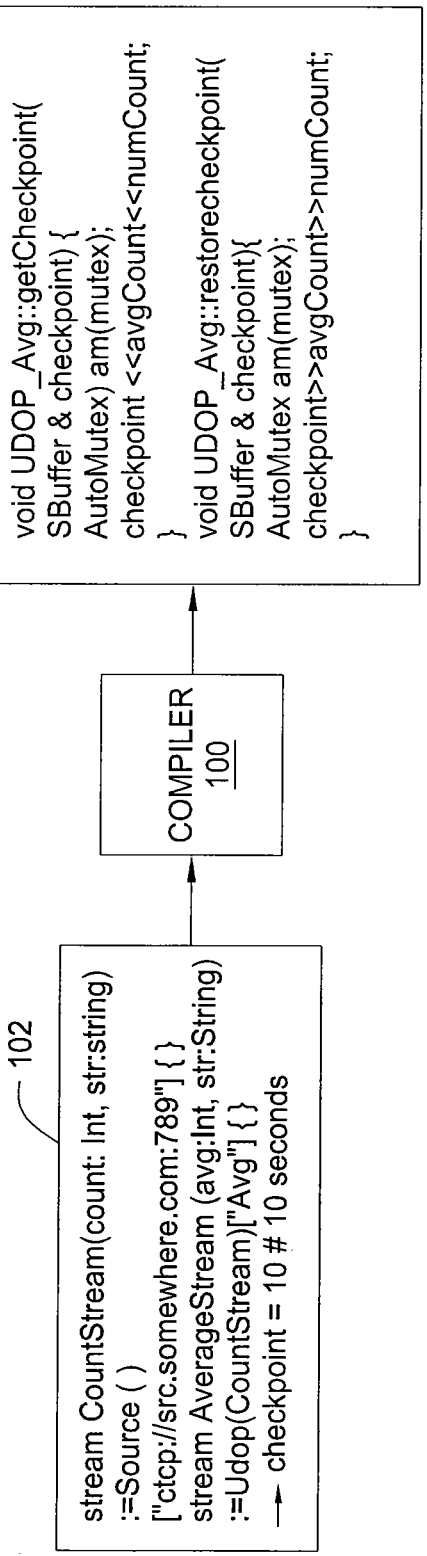
FIG. 1 is a block diagram illustrating one exemplary embodiment of a compiler, according to the present invention.

FIG. 1 is a block diagram illustrating one exemplary embodiment of a compiler 100, according to embodiments of the present invention. The compiler 100 is configured for creating distributed data stream processing applications. As illustrated, the compiler 100 receives source code 102 for a stream processing application. The source code 102 defines which components of the application (e.g., which operators or processing elements) should be fault tolerant through the use of annotations that invoke checkpointing methods, as described in greater detail below. The compiler 100 outputs specialized code 104, deployable on a target machine, that saves the states of the fault tolerant components with a predefined frequency. In one embodiment, the specialized code 104 includes a user-defined operator (UDOP) checkpoint interface.

Embodiments of the present invention may be deployed using the SPADE programming language and within the context of the INFOSPHERE STREAMS distributed stream processing middleware application, commercially available from International Business Machines Corporation of Armonk, N.Y. Specifically, to carry out the behavior chosen by a developer, embodiments of the invention take advantage of the SPADE programming language's code generation framework in order to automatically produce the extra code required by the fault tolerant policies. Although embodiments of the invention are discussed within the exemplary context of the INFOSPHERE STREAMS middleware application and the SPADE programming language framework, those skilled in the art will appreciate that the concepts of the present invention may be advantageously implemented in accordance with substantially any type of stream processing framework and with any programming language.

The INFOSPHERE STREAMS middleware application is non-transactional, since it does not have atomicity or durability guarantees. This is typical in stream processing applications, which run continuously and produce results quickly. Within the context of the INFOSPHERE STREAMS middleware application, independent executions of an application with the same input may generate different outputs. There are two main reasons for this non-determinism. First, stream operators often consume data from more than one source. If the data transport subsystem does not enforce message ordering across data coming from different sources, then there is no guarantee in terms if which message an operator will consume first. Second, stream operators can use time-based windows. Some stream operators (e.g., aggregate and join operators) produce output based on data that has been received within specified window boundaries. For example, if a programmer declares a window that accumulates data over twenty seconds, there is no guarantee that two different executions of the stream processing application will receive the same amount of data in the defined interval of twenty seconds.

The INFOSPHERE STREAMS middleware application deploys each stream processing application as a job. A job comprises multiple processing elements, which are containers for the stream operators that make up the stream processing application's data-flow graph. A processing element hosts one or more stream operators. To execute a job, the user contacts the job manager, which is responsible for dispatching the processing elements to remote nodes. The job manager in turn contacts a resource manager to check for available nodes. Then, the job manager contacts master node controllers at the remote nodes, which instantiate the processing elements locally. Once the processing elements are running, a stream processing core if responsible for deploying the stream connections and transporting data between processing elements.

The INFOSPHERE STREAMS middleware application has many self-healing features, and the job manager plays a fundamental role in many of these. In addition to dispatching processing elements, the job manager also monitors the life cycles of these processing elements. Specifically, the job manager receives information from each master node controller, which monitors which processing elements are alive at its respective node. If a processing element fails, the job manager detects the failure and re-dispatches the failed processing element in the same node. If the failed processing element has crashed due to node failure, the job manager may restart the failed processing element in a different node. During the recovery time, the behaviors of the processing elements connected to the failed processing element differ depending on their specific positions in the data-flow graph. This concept is illustrated in FIGS. 2A and 2B.

Figure 2A:
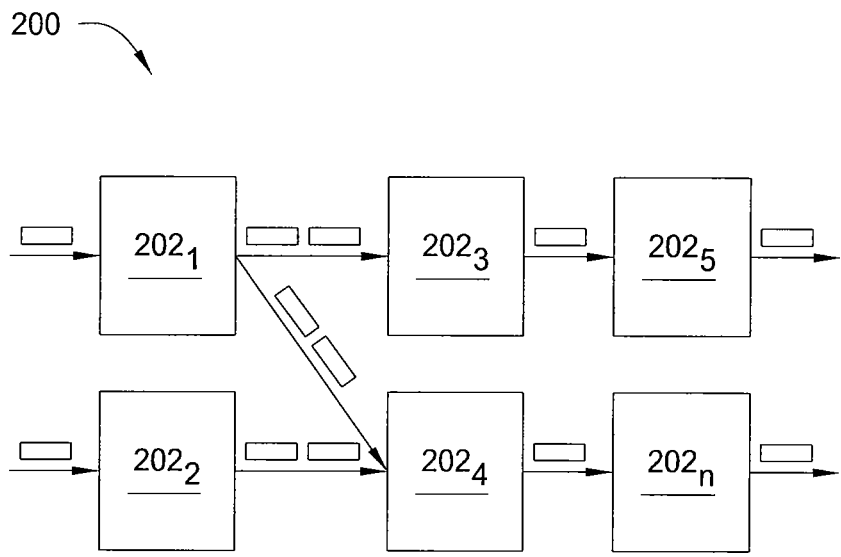
FIGS. 2A and 2B are data-flow graphs illustrating an exemplary stream processing application.
Figure 2B:
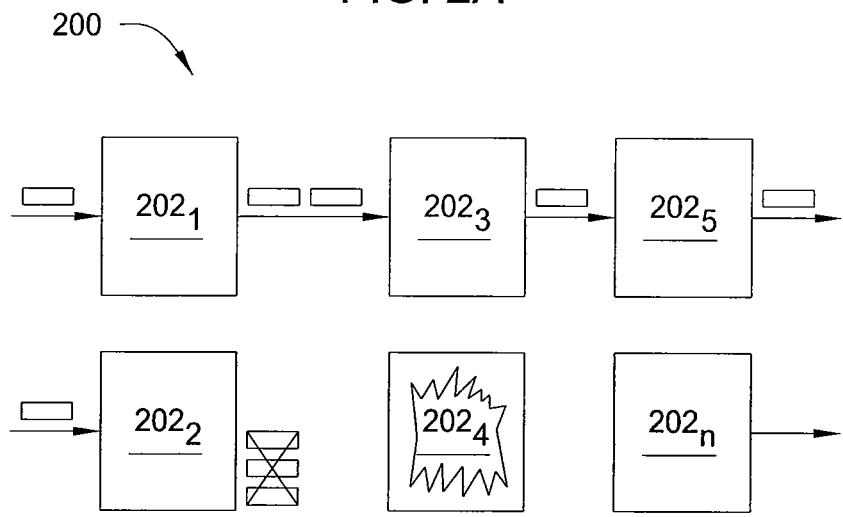

FIGS. 2A and 2B are data-flow graphs illustrating an exemplary stream processing application 200. As illustrated in FIG. 2A, the stream processing application 200 comprises a plurality of processing elements $202_1$-$202_n$, (hereinafter collectively referred to as "processing elements 202") interconnected by streams of data. As illustrated, processing element $202_1$ sends the same data to processing elements $202_3$ and $202_4$. Processing element $202_4$ also consumes data from processing element $202_2$. Processing elements $202_5$ and $202_n$ consume data from processing elements $202_3$ and $202_4$, respectively.

FIG. 2B illustrates the consequences of a failure at processing element $202_4$. As illustrated, processing element $202_n$, does not receive any input streams for processing, and therefore does not produce any data. The behaviors of processing elements $202_1$ and $202_2$ differ, since they are data producers (or sources). The stream processing core will discard all of the new data that processing element $202_2$ consumes, since there is no processing element to consume the data. However, processing element $202_1$ still maintains one live connection and continues to send new data to processing element $202_3$ (but stops sending data to failed processing element $202_4$). Once failed processing element $202_4$ is re-integrated into the application 200, the connections to and from processing element $202_4$ are re-established. At this point, processing element $202_2$ stops discarding data, and processing element $202_1$ resumes sending data over both of its connections.

The SPADE programming language is associated with a compiler for creating distributed data stream processing applications for deployment on the INFOSPHERE STREAMS middleware application (such as the compiler 100 illustrated in FIG. 1). Some features of the SPADE programming language include: (1) a programming language for flexible composition of parallel and distributed data-flow graphs; (2) a toolkit of type-generic, built-in stream processing operators; (3) an extensible operator framework that supports the addition of new type-generic and configurable operators to the programming language, as well as new UDOPs used to wrap existing, possibly legacy analytics; and (4) a broad range of edge adapters used to ingest data from outside sources and to publish data to outside destinations (e.g., network sockets, databases, files systems, and the like).

The SPADE programming language provides a stream-centric operator-based programming model. The stream-centric design implies a programming language in which an application developer can quickly translate the flows of data from a block diagram prototype into the application skeleton simply by listing the data stream flows. The operator-based programming model implies a programming model that is focused on designing the application by considering the smallest possible building blocks that are necessary to deliver the computation that the application is designed to perform. In summary, programs written in the SPADE programming language are data-flow graphs in which operators are connected via streams and serve as the basic computational units that perform stream transformations. A tuple is the basic unit of data in a stream. Each tuple has a set of attributes, built from SPADE programming language basic types (e.g., integer, string, and the like).

One emphasis of the SPADE programming language is on code generation. Given an application specification written in the SPADE programming language, the compiler generates specialized application code based on the computation and communication capabilities of the runtime environment (e.g., the target machine on which the application is to run). This specialization is manifested in several ways, including code fusion. Code fusion is the ability to place multiple operators inside a single processing element. In this case, instead of using the regular stream transport, the streams are converted into function calls. Code fusion results in higher operator throughput, but also affects fault tolerance. For example, if an operator in a group of fused operators hosted by a processing element crashes (e.g., due to a software bug), this results in the crash of the entire set of operators hosted by the processing element.

As discussed above, the programming model of the SPADE programming language is operator-based. To checkpoint an operator, one must define: (1) the behavior of the operator under failure; and (2) the state the operator should have once it recovers from the failure. To minimize the performance overhead, embodiments of the present invention implements techniques that are specific to individual operator types and that can be customizable by different instances a developer might employ in the context of one application. With knowledge of the application, the SPADE programming language can generate code that uses specialized checkpoint techniques for each operator instance based on their parameters. Embodiments of the present invention account for the following for each operator: (1) the minimal operator state required in order to recover from a failure; (2) whether the operator is able to produce semantically correct results after recovery from a failure; and (3) whether the restored state of the operator contains stale data. Embodiments of the present invention assume a fail-stop model for an operator failure.

With respect to operator states, the SPADE programming language includes both stateless and stateful operators. An example of an operator that can be either stateless or stateful is a Functor. Functors perform tuple-level manipulations such as filtering, projection, and mapping. For every incoming tuple, the Functor generates an output, unless the input tuple does not satisfy an associated filtering predicate. If the filtering predicate does not involve any variables other than the attributes of the current tuple (e.g., such as a filtering predicate that filters a tuple having a stream attribute that is greater than a predefined value), then the operator is stateless (i.e., there is no need to save state). If the operator crashes and restarts, it can still filter tuples according to the same filtering predicate. By contrast, if the Functor operator is customized to update state variables when it receives a tuple (e.g., such as compute a running average over an attribute), then the operator is stateful (i.e., state must be saved). In this case, the state variables should be checkpointed. It should be noted that a variable value can be affected by tuple loss (e.g., such as the maximum value of an attribute).

Depending on the operator type, checkpointing of the internal operator state and restarting it may not be enough to provide correct operator semantics. For example, the barrier operator synchronizes logically related streams and emits an output tuple every time it receives at least one tuple on all of its inputs. When a processing element fails, tuples may be lost during the recovery time. For a barrier operator to provide semantically correct results after recovery, in-flight tuples must be saved. Thus, for this type of operator, additional techniques such as upstream backup are needed. Embodiments of the present invention enable an application developer to enforce, through code generation, in-flight tuple buffering only for the operators that require such semantics.

In stream processing applications, it is possible that the operator state is valid only during a certain time frame. For example, the aggregate operator groups and summarizes incoming tuples according to an operation (i.e., sum, average, or the like) performed over all tuples that are within a window boundary. The application developer may parameterize the window behavior based on size (x) and an output interval (y). The size of the window can be defined as all of the tuples accumulated over the last x seconds. Thus, as new tuples arrive, the operator discards tuples that are older than x seconds. At every y seconds, the operator computes the aggregate function based on the current contents of the window. In the event of a failure, the restored state of an aggregate operator contains all of the tuples that are inside the window at the time of the checkpoint. This means that upon recovery, the stream processing middleware must handle stale data. If the failure had not occurred, some of these tuples would have been discarded under normal operation due to the arrival of new tuples. Thus, recovery of the operator must eliminate the expired tuples. Embodiments of the invention modify the SPADE programming language infrastructure to support checkpointing and add fault tolerance to UDOPs and to windowed stream operators.

As discussed above, embodiments of the present invention supports selective fault tolerance by allowing a user (e.g., application developer) to define in the source code what parts (i.e., operators) of the application should be fault tolerant through the use of programming language constructs. In particular, the user annotates the source code to implement checkpointing in at least one of the application operators. The compiler then generates specialized code that saves the state of those operators with the frequency defined by the user. In one embodiment, the compiler automatically generates the checkpointing methods for built-in SPADE programming language operators. The state of each operator is assumed to be independent from the states of other operators. When operators are fused into the same processing element, the state of each operator in the processing element is saved according to its respective frequency. In one embodiment, the states of at least some of the operators in the processing element are saved at different times (as opposed to at the same time), in order to preserve maximum throughput. Due to performance overheads, the user may not want to checkpoint an operator that has a large state with the same frequency that an operator that has a small state is checkpointed. The state independent also applies to processing elements. During recovery of a processing element, the states of other interconnected processing elements are not rolled back. This is consistent with the recovery model described in connection with FIGS. 2A and 2B.

Referring back to FIG. 1, the source code 102 illustrates an exemplary way to specify that an operator should be checkpointed. As illustrated, the exemplary source code 102 indicates a source (Source) and a user-defined operator (UDOP). The source stream (CountStream) produces tuples with an integer (count) and a string (str), extracted from the packets coming from a transmission control protocol (TCP) client located at src.somewhere.com:789. The user-defined operator (UDOP) creates an AverageStream where each tuple contains an integer (avg) and a string (str). The UDOP contains the checkpoint keyword (checkpoint) and the associated checkpoint frequency in seconds (ten seconds).

The compiler (e.g., the compiler 100 illustrated in FIG. 1) generates code for both the operators and the processing elements, with or without code fusion. For the operators, the compiler generates extra code so that checkpointing policies can be implemented. The extra code is dependent on the operator type (e.g., Source, Function, Join, Aggregate, Sink, or the like) and configuration. The compiler modifies the configuration of the processing elements to selectively enable checkpointing policies for the operators contained therein.

Figure 3:
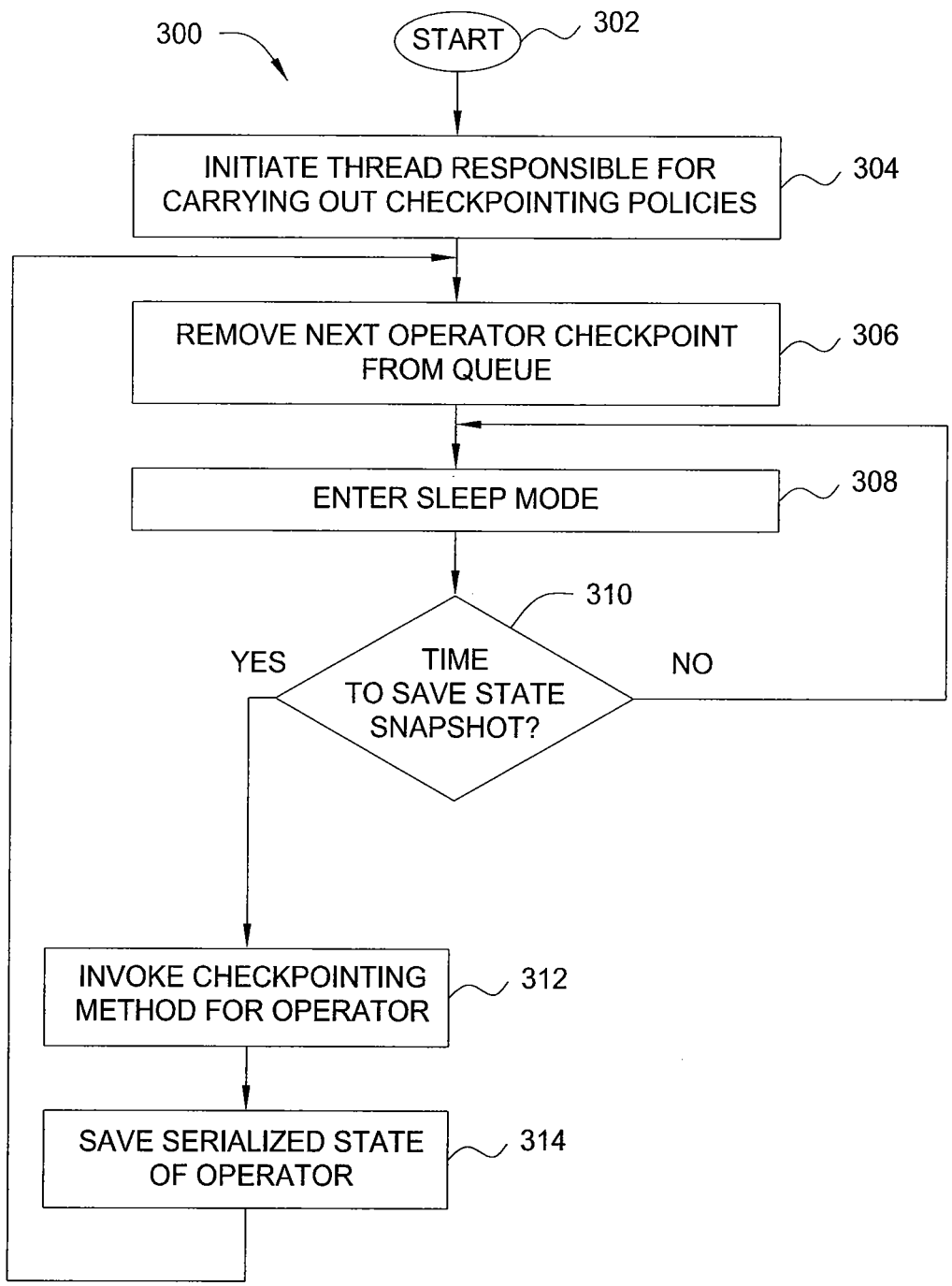
FIG. 3 is a flow diagram illustrating one embodiment of a method for performing checkpointing.

FIG. 3 is a flow diagram illustrating one embodiment of a method 300 for performing checkpointing, in accordance with the present invention. The method 300 may be implemented, for example, at a processing element that contains one or more operators that employ checkpointing policies. Thus, the normal operation of the processing element changes if any of the operators contained therein is implemented in code that invokes the checkpointing keyword.

The method 300 is initialized at step 302 and proceeds to step 304, where the processing element wrapper, which manages all of the operators contained in the processing element, initiates a thread (referred to as "PECheckpoint") responsible for carrying out the checkpointing policies of the operators. Specifically, the PECheckpoint thread verifies which operators should be checkpointed and builds a priority queue with the next checkpoint time for each of these operators.

In step 306, the PECheckpoint thread removes the next operator to be checkpointed from the queue (e.g., by invoking a getExpiringOperator( )method). The PECheckpoint thread then enters sleep mode in step 308.

In step 310, the method 300 determines whether it is time to save the next state snapshot (i.e., in accordance with the checkpointing policies for the operators). If the method 300 concludes in step 310 that it is not time to save the next state snapshot, the method 300 returns to step 308, and the PECheckpoint thread remains in sleep mode.

Alternatively, if the method 300 concludes in step 310 that it is time to save the next state snapshot, the method 300 returns to step 308, the PECheckpoint thread wakes and invokes a checkpointing method associated with the operator for which the state snapshot is to be saved. In one embodiment, the checkpointing method (referred to as "getCheckpoint( )") contains logic to serialize (i.e., convert to bits that can be stored) the state of the operator. In one embodiment, the state snapshot saves data that would be required to recover the operator to a semantically correct state. This data may vary depending on the type of operator for which the checkpointing method is invoked. For instance, if the operator is a join operator, the state snapshot would save the tuples contained in the correlation windows of the operator. If the operator is a user-defined operator, the state snapshot would save the variable that contains the attribute average. If the operator is an aggregate operator, the state snapshot would save the tuples contained in the aggregate window. In one embodiment, the operator cannot process any new incoming tuples while the getCheckpoint( )method is executing.

In step 314, the method 300 saves the serialized state of the operator to a storage subsystem in the processing element (e.g., using a class referred to as "OPState"). In one embodiment, the OPState class saves the new, serialized state of the operator in a temporary file before renaming it to a permanent file through an atomic rename( ) operation. The method 300 then returns to step 306 and proceeds as described above to continue enforcing the checkpointing policies of the processing element's operators.

Figure 4:
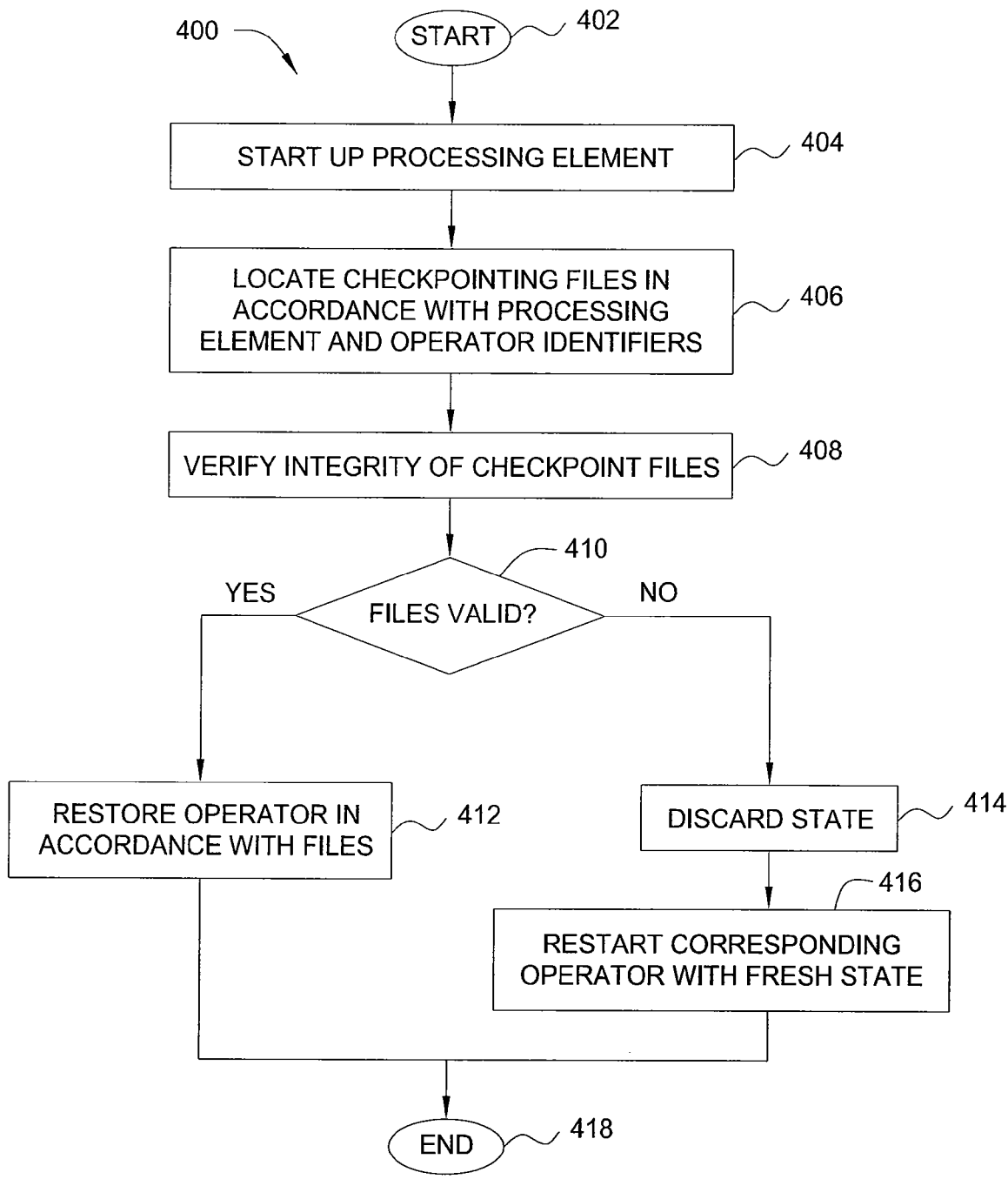
FIG. 4 is a flow diagram illustrating one embodiment of a method for recovering a processing element from failure.

FIG. 4 is a flow diagram illustrating one embodiment of a method 400 for recovering a processing element from failure, according to the present invention. The method 400 may be implemented, for example, at a processing element that contains one or more operators that employ checkpointing policies.

The method 400 is initialized at step 402 and proceeds to step 404, where the processing element starts up. In step 406, the processing element locates checkpoint files in accordance with identifiers for the processing element and the operators contained therein. These identifiers are constant throughout the lifetime of the processing element.

In step 408, the processing element verifies the integrity of the located checkpoint files. In one embodiment, file integrity is verified using a hash value computed and stored by the OPState class.

In step 410, the processing element determines whether the checkpoint files are valid. If the processing element concludes in step 410 that the checkpoint files are valid, then method 400 proceeds to step 412, where the processing element 400 restores the associated operators in accordance with the checkpoint files. In one embodiment, where the operator's state is restarted using multiple checkpoint files, a restoreCheckpoint( ) method is invoked in the operator class. The restoreCheckpoint( ) method is a de-serialization method that is specialized for each operator type.

Alternatively, if the processing element concludes in step 410 that the checkpoint files are corrupt, then method 400 proceeds to step 414, where the processing element discards the operator state indicated by the corrupt files.

In step 416, the processing element restarts the operators corresponding to the corrupt files with a fresh state. In one embodiment, the processing element maintains different versions of the checkpoint files for each operator, and will restart a failed operator in accordance with an older checkpoint file in the event of corruption of the most recent checkpoint file.

Having restarted the operators in accordance with the checkpoint files or in accordance with a fresh state, the method 400 terminates in step 418.

As discussed above, an application developer can, using the SPADE programming language, extend the basic set of built-in operators via user-defined operators (UDOPs). Using UDOPs, an application developer can use external libraries and implement customized operations for the application. The SPADE programming language generates skeleton code so that an operator can easily handle tuples from streams, process the tuples with the specialized code, and send the processed tuples as a stream to other operators.

To checkpoint UDOPs, the SPADE programming language compiler adds checkpoint method interfaces to the generated skeleton code. The application developer then fills in the checkpoint methods with the appropriate serialization logic. The PECheckpoint thread of a processing element wrapper, discussed above, will automatically invoke the serialization methods at the specified frequency.

Referring back to FIG. 1, the exemplary specialized code 104 illustrates these checkpoint method interfaces, as well as an example of how the serialization code is added. This is only part of the compiler output for the source code 102. In the illustrated example, the state of the UDOP has two member variables (i.e., avgCount and numCount). The application developer receives a reference to a serialization buffer object (SBuffer), which is used for both state-saving and state-restoring methods. The application developer must serialize and de-serialize the data to and from the buffer in the same order. Because other methods may modify the member variables during checkpointing, in one embodiment the member variables are protected by a mutual exclusion construct.

In some embodiments, the techniques of the methods 300 and 400 are modified slightly to account for operators that employ sliding windows for tuple processing. For example, the Join operator correlates two streams in accordance with a join predicate and a window configuration. Two different windows (i.e., one window per incoming stream) group the tuples from their respective incoming streams. Each stream may have a different window configuration. The tuples are ordered in the windows based on their order of arrival. Once the Join operator receives an input tuple from the first stream, it evaluates the join predicate condition against all of the tuples in the window associated with the second stream. If the predicate evaluates to true, the Join operator pairs the matching tuples and sends the pair downstream. After the pairing stage, the Join operator inserts the input tuple from the first stream into its corresponding window. If the window is full, the oldest tuple in the window is discarded (i.e., the window slides).

A Join operator can have an arbitrarily large window. Tuples in Join operators may accumulate over a long period of time, depending on the stream input rate. If the Join operator crashes and there is no checkpoint, the Join operator will produce few outputs for a long time, since the windows must be filled up in order to produces matches at the highest possible rate. If there is a checkpoint, most of the window content can be recovered, and the Join operator will therefore be able to produce matches at the highest rate as soon as the restore method is executed.

If the same checkpoint technique is used for the Join operator that is used for UDOPs (e.g., as discussed with respect to FIGS. 3 and 4), all of the tuples in the windows of the Join operator should be serialized. This will result in the serialization of large amounts of data, which introduces a prohibitive performance overhead. Embodiments of the present invention reduce this overhead by employing an incremental checkpointing technique for operators that employ sliding windows, such as Join operators. In some embodiments, these incremental checkpointing techniques perform a checkpoint maintenance operation for each tuple that arrives at an operator.

In a sliding window configuration, as new tuples arrive in the window, older tuples are evicted from the window. This behavior can be implemented with a double-ended queue data structure in which new tuples are inserted at the tail of the queue and old tuples are removed from the head of the queue. In the time passing between a last checkpoint and a current checkpoint, the state of the operator can be described by two possible configurations. Either: (1) the window contains only new tuples relative to the last checkpoint (i.e., the total number of new tuples that has arrived since the last checkpoint exceeds the size of the window); or (2) the window contains new tuples and old tuples relative to the last checkpoint (i.e., the total number of new tuples that has arrived since the last checkpoint is less than the size of the window). In the first instance, there is no common state between the last checkpoint and the current checkpoint. In the second case, there is some commonality, and serialization time can be decreased by avoiding re-serialization of the tuples that are part of both the last checkpoint and the current checkpoint (i.e., the old tuples).

Embodiments of the invention minimize re-serialization by incrementally saving sections of the same window using independent checkpoint files. This is implemented using a circular buffer data structure that divides each sliding window into sub-windows or fixed groups of tuples. At every checkpoint interval, the present invention determines which sub-windows contain new tuples relative to the last checkpoint, and the contents of these windows are saved to disk (i.e., the new and old tuples are serialized in a group). Re-serialization is limited by dividing the window into the sub-windows. Windows whose contents have not changed relative to the last checkpoint do not need to be re-saved. Since the windows slide, only sub-windows that contain more recent tuples change.

In one embodiment, each position in the circular buffer contains the following data: (1) a checkpointing file name; (2) a dirty bit, which indicates if the sub-window should be serialized to disk; (3) the current number of tuples in the sub-window; and (4) the window index of the most recent tuple in the sub-window, so that the double ended queue data structure can be correctly indexed. In one embodiment, the circular buffer is updated only at each checkpoint interval in order to minimize performance overhead.

In one embodiment, the number of positions in the circular buffer data structure is based on the number of tuples to be saved per checkpoint operation. The window size is divided by the number of tuples per checkpoint file plus one extra position. The extra position accounts for the slide of the window.

Figure 5:
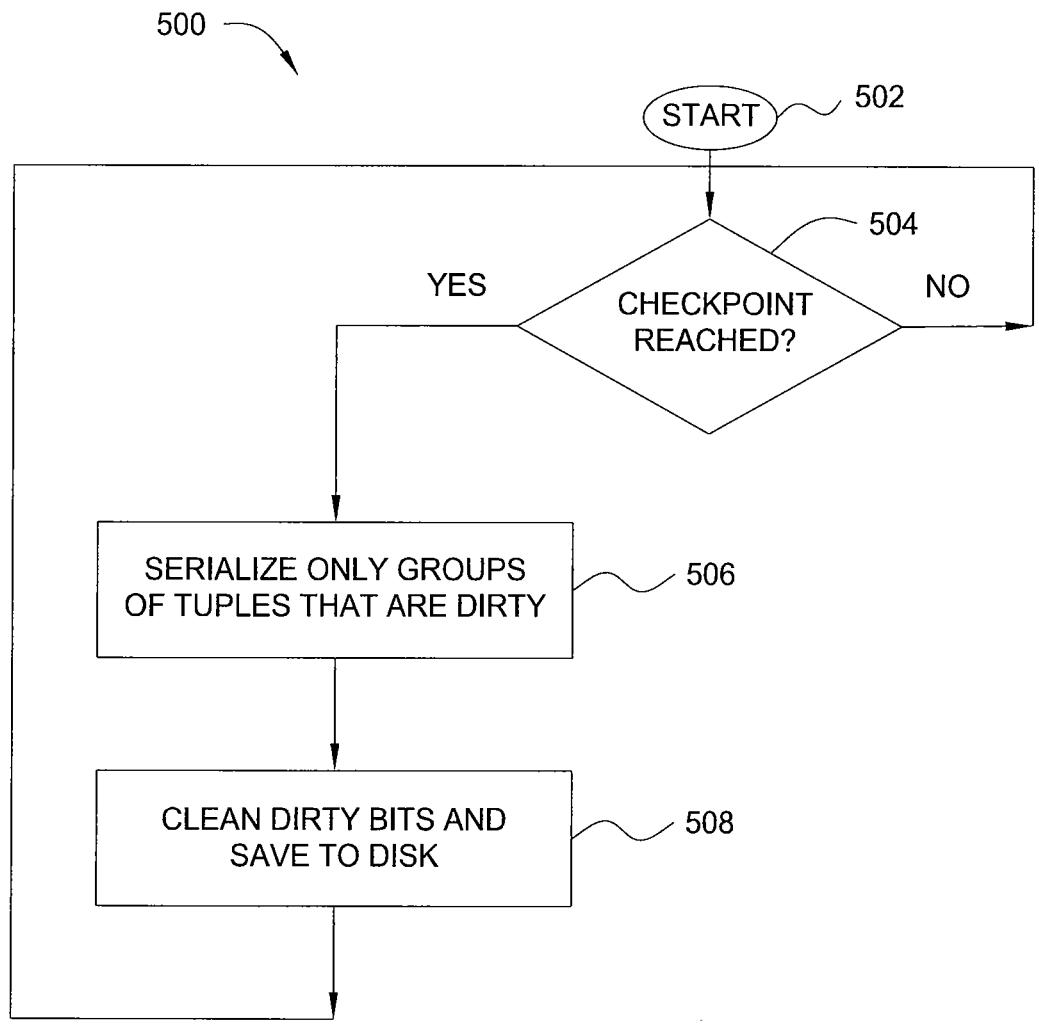
FIG. 5 is a flow diagram illustrating one embodiment of the method for checkpointing an operator that employs at least one sliding window, according to the present invention.

FIG. 5 is a flow diagram illustrating one embodiment of the method 500 for checkpointing an operator that employs at least one sliding window, according to the present invention. Thus, the method 500 is similar in some ways to the method 300 described above; however, the method 500 accounts for the fact that the operator incorporates a sliding window.

The method 500 is initialized is step 502 and proceeds to step 504, where the method 500 determines whether a checkpoint has been reached. If the method 500 concludes in step 502 that a checkpoint has not been reached, the method 500 returns to step 502 and continues to wait for the next checkpoint.

Alternatively, if the method 500 concludes in step 502 that a checkpoint has been reached, the method 500 proceeds to step 504 and serializes only the sub-windows or groups of tuples that are dirty (e.g., as indicated by the dirty bit). The method 500 then cleans the dirty bits in step 506 before returning to step 502 and waiting for the next checkpoint. The method 500 is further illustrated by FIGS. 6A and 6B.

Figures 6A, 6B:
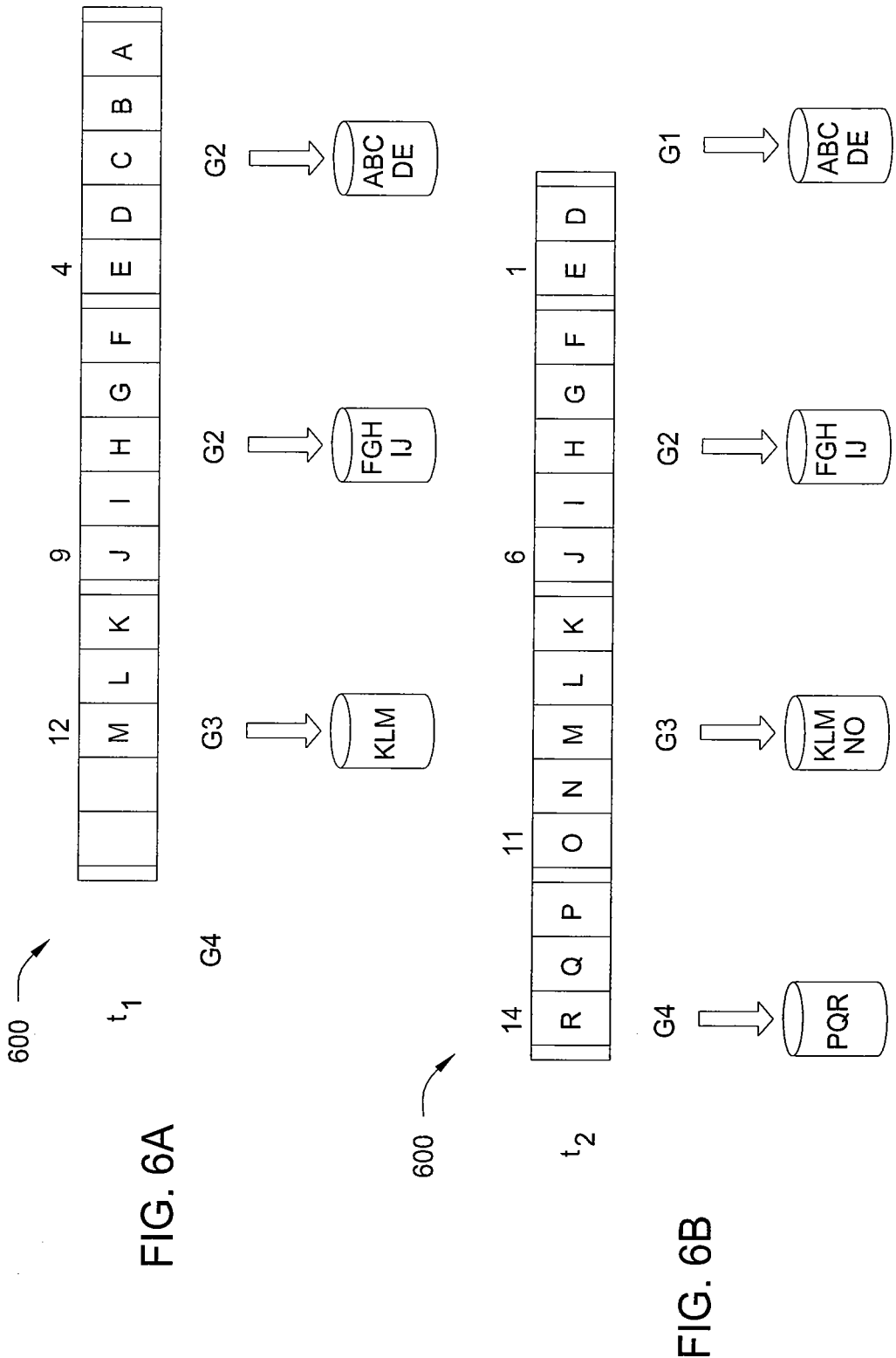
FIGS. 6A and 6B are schematic diagrams illustrating an exemplary sliding window, according to the present invention.

FIGS. 6A and 6B are schematic diagrams illustrating an exemplary sliding window 600, according to the present invention. Specifically, FIG. 6A illustrates the sliding window 600 at a first checkpoint time t1, while FIG. 6B illustrates the sliding window 600 at a subsequent checkpoint time t2.

The exemplary sliding window 600 is a circular buffer implemented as a count-based fifteen-tuple sliding window, although the present invention is not limited to sliding windows of this specific configuration or size. The sliding window 600 comprises four sub-windows or checkpoint groups: G1, G2, G3, and G4. At the first checkpoint time t1 (illustrated in FIG. 6A), the sliding window 600 contains thirteen new tuples (A-M). Sub-window G1 and G2 each contain five tuples, while sub-window G3 contains three tuples and sub-window G4 contains no tuples. When the checkpointing method (e.g., the method 500) evaluates the circular buffer structure, it will conclude that sub-windows G1, G2, and G3 are dirty (i.e., contain new tuples). Thus, the tuples in sub-windows G1, G2, and G3 will be serialized based on the indices maintained by the circular buffer. In one embodiment, no tuple processing is performed by the operator during this serialization. After the tuples in sub-windows G1, G2, and G3 have been serialized, the dirty bits in the circular buffer are cleaned and the tuples are saved to disk as described above.

At the subsequent checkpoint time t2 (illustrated in FIG. 6B), the sliding window 600 contains five new tuples (N-R). Specifically, sub-window G3 has gained tuples N-O and sub-window G4 has gained tuples P-R. Sub-window G1 has lost three tuples (A-C) due to the slide of the window 600. When the checkpointing method evaluates the circular buffer structure, it will conclude that sub-windows G3 and G4 are dirty. Thus, only the tuples in sub-windows G3 and G4 (K-R) will be serialized and saved. Even though sub-window G1 lost tuples, its corresponding checkpoint file (generated at first checkpoint time t1) is not updated; the checkpoint file will be valid for sub-window G1 until it loses all of its tuples. In one embodiment, the checkpoint file is reused after the window slides by an entire sub-window's worth of tuples (e.g., five tuples in this exemplary case).

Figure 7:
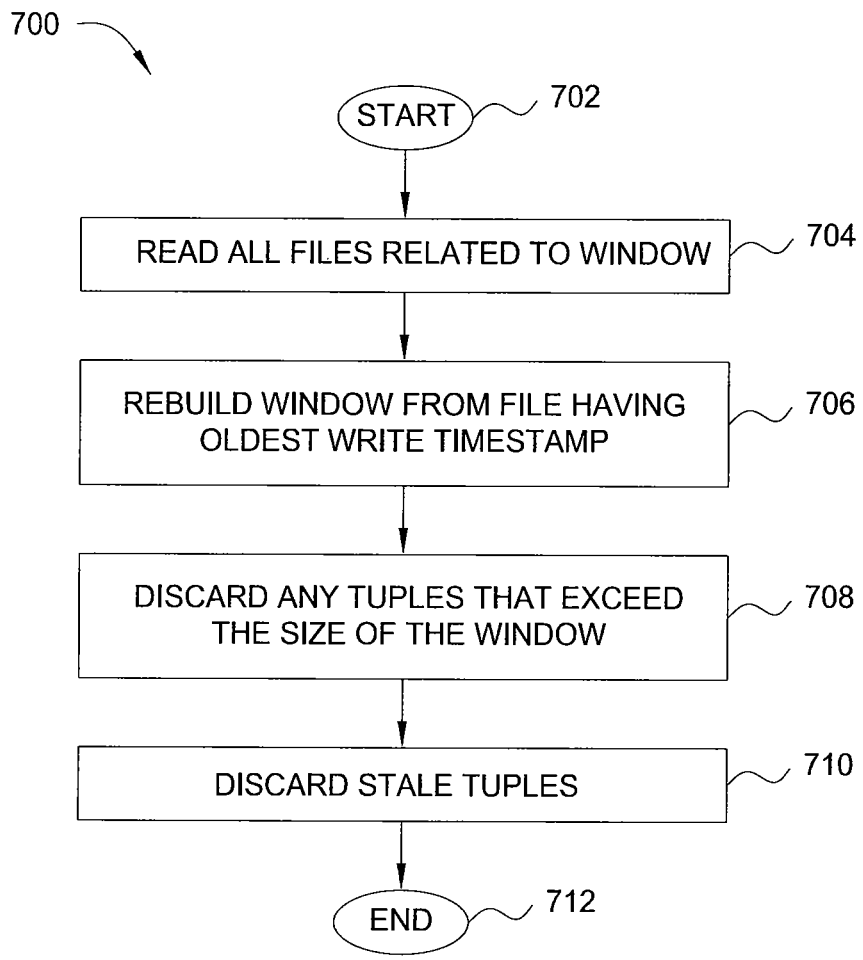
FIG. 7 is a flow diagram illustrating one embodiment of a method for recovering the state of an operator that employs at least one sliding window, according to the present invention.

FIG. 7 is a flow diagram illustrating one embodiment of a method 700 for recovering the state of an operator that employs at least one sliding window, according to the present invention. Thus, the method 700 is similar in some ways to the method 400 described above; however, the method 700 accounts for the fact that the operator incorporates a sliding window. Specifically, the method 700 describes a method for restoring a window of an operator that employs at least one sliding window; thus, if the operator employs more than one sliding window, the method 700 may be invoked multiple times (i.e., once for each window).

The method 700 is initialized at step 202 and proceeds to step 704, where the method 700 reads all of the checkpoint files related to a window used by the operator. Since a circular buffer is used, the first valid tuple of the window can reside in any sub-window of the window.

In step 706, the method 700 begins rebuilding the window from the checkpoint file that has the oldest write timestamp. This file corresponds to the sub-window that has remained unchanged (i.e., has not been updated or re-serialized) for the longest period of time; thus, this sub-window represents the beginning of the sliding window.

Restoring all of the tuples from the checkpoint file that has the oldest write timestamp may result in a window that is bigger than its maximum size. Thus, in step 708, the method 700 discards all tuples that exceed the total size of the window (i.e., including all sub-windows).

In step 710, the method 700 discards any stale tuples. If the operator had not failed, some of the tuples from the beginning of the window would have been discarded due to the sliding of the window; thus, the method 700 accounts for stale data. In one embodiment, stale tuples are discarded by estimating how many tuples would have been discarded during normal operation of the operator. This estimate is then used to remove the N oldest tuples from the window. In one embodiment, the number of stale tuples is estimated according to the following formula:

$$N=(T_{recovery}-T_{serialization})*N_{tuples/second} \quad \text{(EQN. 1)}$$

Where $T_{Recovery}$ is the Time after the De-Serialization Routine Completes, $T_{serialization}$ is the time of operator state serialization, and $N_{tuples/second}$ is the number of tuples per second received by the sliding window. $T_{serialization}$ and $N_{tuples/second}$ can be retrieved from the checkpoint files. In one embodiment, $T_{serialization}$ and $N_{tuples/second}$ are obtained at runtime and are serialized with the tuples in the checkpoint files. The number N calculated by EQN. 1 is only an approximation of the number of stale tuples, since there may be variance in the input tuple rate.

The method 700 can also account for corrupt checkpoint files. Since the operator state is divided into multiple checkpoint files (each corresponding to a sub-window of the sliding window), the operator state can be recovered even if one of those checkpoint files is corrupted. The implication of a corrupted checkpoint file is the loss of, at most, the same number of tuples contained in the corresponding sub-window.

In one embodiment, when the operator to be checkpointed is a Join operator, a compiler generates modified Join code to enable checkpointing as described in connection with FIGS. 5-7. The Join operator will implement two checkpointing methods: one checkpointing method for each input port. The two checkpointing methods are modified to include a mutual exclusion variable and a counter of new tuples per window. In one embodiment, this is the only code added to the operator's critical path. For per-group Join operators (i.e., where the operator allocates a new sliding window depending on tuple key attribute contents), code can be added dynamically to the circular buffer data structure and the new tuple counter.

The new tuple counter helps to estimate the operator's input rate and to update the indices contained in the circular buffer. Once the checkpoint method executes, it slides the circular buffer data structure by the number of new tuples. The circular buffer code is generic and does not need to be specialized for each Join configuration. The only parameters that are needed are the window size and the number of tuples in each sub-window. The number of tuples in each sub-window can be estimated based on the tuple size and the operator input rate, and can be learned during the operator profiling phase.

For incremental checkpointing, the checkpointing method interface changes. Since independently serializable buffers are needed, extra checkpointing methods are added at the operator interface. The checkpointing thread will invoke the correct checkpointing and restore methods (e.g., methods 300 and 400 or methods 500 and 700) according to the operator type.

For per-group Join operators, a specialized class is automatically generated that associates serialization buffers and per-group keys. Since the key type is dependent on the tuple type, which is defined at the programming language level, the checkpointing thread does not know the key type. This specialized class abstracts the serialization buffer's key-based access to the checkpoint thread.

Figure 8:
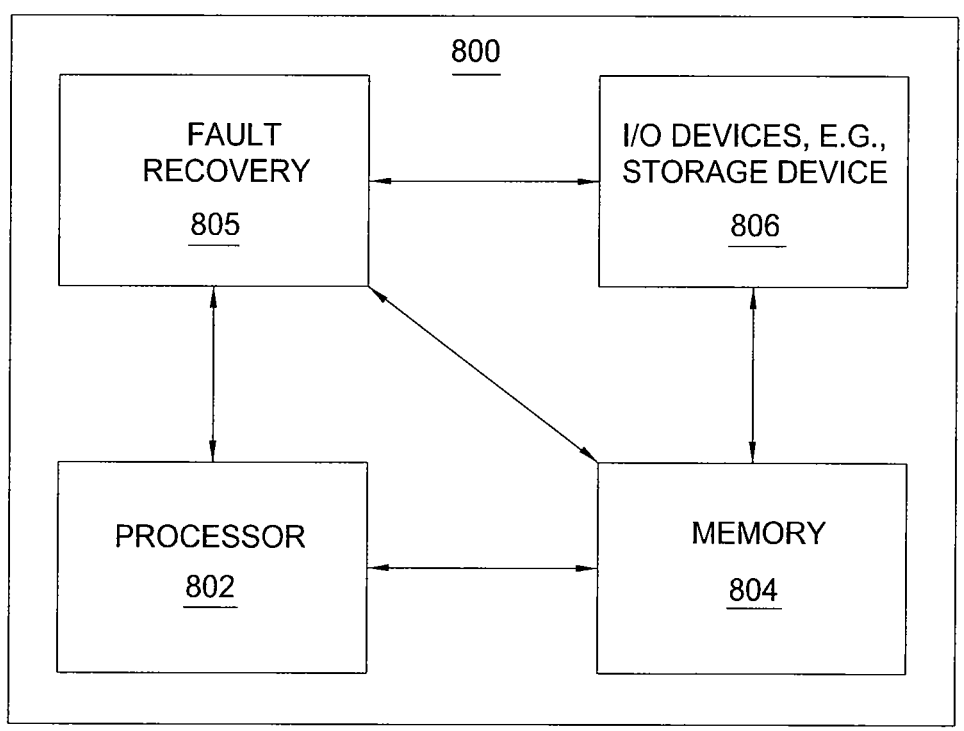
FIG. 8 is a high-level block diagram of the failure recovery method that is implemented using a general purpose computing device.

FIG. 8 is a high-level block diagram of the failure recovery method that is implemented using a general purpose computing device 800. In one embodiment, a general purpose computing device 800 comprises a processor 802, a memory 804, a failure recovery module 805 and various input/output (I/O) devices 806 such as a display, a keyboard, a mouse, a stylus, a wireless network access card, and the like. In one embodiment, at least one I/O device is a storage device (e.g., a disk drive, an optical disk drive, a floppy disk drive). It should be understood that the failure recovery module 805 can be implemented as a physical device or subsystem that is coupled to a processor through a communication channel.

Alternatively, the failure recovery module 805 can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Thus, in one embodiment, the failure recovery module 805 for providing fault tolerance for stream processing applications, as described herein with reference to the preceding figures, can be stored on a computer readable storage medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for providing a failure recovery mechanism for a stream processing application comprising a plurality of components, the method comprising:
   receiving, by a compiler, source code for the stream processing application, wherein the source code defines a checkpointing frequency with which a checkpoint file is to be generated for each of the plurality of components, and wherein respective checkpointing frequencies defined for at least two of the plurality of components are different, and wherein different respective checkpointing frequencies are defined for the at least two of the plurality of components based on a parameter that differs between the at least two of the plurality of components, the parameter being at least one of: whether the at least two of the plurality of components are stateful or stateless, whether the at least two of the plurality of components are windowed stream operators, or sizes of respective states of the at least two of the plurality of components, wherein a stateful component is a component that operates on state variables, and wherein a stateless component is a component that does not operate on state variables;
   generating, by the compiler, a sequence of instructions for converting a state of the at least one of the plurality of components into a checkpoint file comprising a sequence of storable bits on a periodic basis, according to the checkpointing frequency defined for the at least one of the plurality of components;
   initiating execution of the stream processing application; and
   storing, during execution of the stream processing application, the checkpoint file at a location that is accessible after failure recovery.

2. The method of claim 1, wherein the at least one of the plurality of components comprises at least one sliding window for storing incoming stream data.

3. The method of claim 2, wherein the at least one sliding window is divided into a plurality of sub-windows, each of the plurality of sub-windows being sized to store a fixed number of tuples of the incoming stream data.

4. The method of claim 3, wherein the generating comprises:
   identifying one or more of the plurality of sub-windows that contain at least one new tuple relative to a respective previous checkpoint file for the one or more of the plurality of sub-windows; and
   generating the sequence of instructions such that only contents of the one or more of the plurality of sub-windows is converted.

5. The method of claim 4, wherein each of the one or more of the plurality of sub-windows contains a dirty bit indicating the presence of the at least one new tuple.

6. The method of claim 1, wherein the storing comprises:
   storing the checkpoint file in a temporary file; and
   renaming the checkpoint file to a permanent file through an atomic rename operation.

7. The method of claim 1, wherein at least one of the at least two of the plurality of components is a stream processing operator.

8. The method of claim 1, wherein at least one of the at least two of the plurality of components is a processing element that hosts one or more stream processing operators.

9. The method of claim 1, wherein the checkpointing frequency is user-defined.

10. A non-transitory computer readable storage device containing an executable program for providing a failure recovery mechanism for a stream processing application comprising a plurality of components, where the program performs the steps of:
    receiving, by a compiler, source code for the stream processing application, wherein the source code defines a checkpointing frequency with which a checkpoint file is to be generated for each of the plurality of components, and wherein respective checkpointing frequencies defined for at least two of the plurality of components are different, and wherein different respective checkpointing frequencies are defined for the at least two of the plurality of components based on a parameter that differs between the at least two of the plurality of components, the parameter being at least one of: whether the at least two of the plurality of components are stateful or stateless, whether the at least two of the plurality of components are windowed stream operators, or sizes of respective states of the at least two of the plurality of components, wherein a stateful component is a component that operates on state variables, and wherein a stateless component is a component that does not operate on state variables;
    generating, by the compiler, a sequence of instructions for converting a state of the at least one of the plurality of components into a checkpoint file comprising a sequence of storable bits on a periodic basis, according to the checkpointing frequency defined for the at least one of the plurality of components;
    initiating execution of the stream processing application; and
    storing, during execution of the stream processing application, the checkpoint file at a location that is accessible after failure recovery.

11. The non-transitory computer readable storage device of claim 10, wherein the at least one of the plurality of components comprises at least one sliding window for storing incoming stream data.

12. The non-transitory computer readable storage device of claim 11, wherein the at least one sliding window is divided into a plurality of sub-windows, each of the plurality of sub-windows being sized to store a fixed number of tuples of the incoming stream data.

13. The non-transitory computer readable storage device of claim 12, wherein the serializing comprises:
    identifying one or more of the plurality of sub-windows that contain at least one new tuple relative to a respective previous checkpoint file for the one or more of the plurality of sub-windows; and
    generating the sequence of instructions such that only contents of the one or more of the plurality of sub-windows is converted.

14. The non-transitory computer readable storage device of claim 13, wherein each of the one or more of the plurality of sub-windows contains a dirty bit indicating the presence of the at least one new tuple.

15. The non-transitory computer readable storage device of claim 10, wherein the storing comprises:
    storing the checkpoint file in a temporary file; and
    renaming the checkpoint file to a permanent file through an atomic rename operation.

16. The non-transitory computer readable storage device of claim 10, wherein at least one of the at least two of the plurality of components is a stream processing operator.

17. The non-transitory computer readable storage device of claim 10, wherein at least one of the at least two of the plurality of components is a processing element that hosts one or more stream processing operators.

18. The non-transitory computer readable storage device of claim 10, wherein the checkpointing frequency is user-defined.

19. An apparatus for providing a failure recovery mechanism for a stream processing application comprising a plurality of components, the apparatus comprising:
   a processor;
   a memory;
   an input device to receive source code for the stream processing application, where the source code defines a subset of the plurality of components that are fault tolerant, and wherein at least two components in the subset are associated with a different checkpointing frequency that defines a frequency with which a checkpoint file is to be generated for an associated one of the at least two components, and wherein different respective checkpointing frequencies are defined for the at least two of the plurality of components based on a parameter that differs between the at least two of the plurality of components, the parameter being at least one of: whether the at least two of the plurality of components are stateful or stateless, whether the at least two of the plurality of components are windowed stream operators, or sizes of respective states of the at least two of the plurality of components, wherein a stateful component is a component that operates on state variables, and wherein a stateless component is a component that does not operate on state variables;
   a compiler to translate the source code into specialized code executable on a target machine, where the specialized code defines one or more methods for providing fault tolerance to the subset of the plurality of components; and
   an output device to provide the specialized code to the target machine.

20. The apparatus of claim 19, wherein at least one component in the subset comprises at least one sliding window for storing incoming stream data.

21. The apparatus of claim 20, wherein the at least one sliding window is divided into a plurality of sub-windows, each of the plurality of sub-windows being sized to store a fixed number of tuples of the incoming stream data.

22. The apparatus of claim 21, wherein the compiler performs operations comprising:
   identifying one or more of the plurality of sub-windows that contain at least one new tuple relative to a respective previous checkpoint file for the one or more of the plurality of sub-windows; and
   converting contents of only the one or more of the plurality of sub-windows into a sequence of storable bits.

23. The apparatus of claim 19, wherein at least one component in the subset is a stream processing operator.

24. The apparatus of claim 19, at least one component in the subset is a processing element that hosts one or more stream processing operators.

25. The method of claim 1, wherein the predefined checkpointing frequency defines a regular interval between consecutive instances at which the checkpoint file is to be generated for a respective one of the plurality of components.

* * * * *